United States Patent [19]

Takaichi et al.

[11] 4,133,530
[45] Jan. 9, 1979

[54] GAME TABLE FOR BOOTH INSTALLATION

[75] Inventors: Peter L. Takaichi, San Jose; Andrew W. Graybeal, Palo Alto, both of Calif.

[73] Assignee: Atari, Inc., Sunnyvale, Calif.

[21] Appl. No.: 836,093

[22] Filed: Sep. 23, 1977

[51] Int. Cl.$^2$ .............................................. A63F 3/00
[52] U.S. Cl. ................................................ 273/85 G
[58] Field of Search .................... 273/1 R, 1 E, 85 G, 273/85 R, 237, 309; 194/1 A, 1 B, 1 F; D34/5L, 5 J

[56] References Cited

U.S. PATENT DOCUMENTS

| | | | |
|---|---|---|---|
| 3,802,708 | 4/1974 | Libert | 273/237 |
| 3,940,136 | 2/1976 | Runte | 273/85 G |

OTHER PUBLICATIONS

Vending Times, 9-1975, p. 61.
Vending Times, 9-1976, p. 89.

*Primary Examiner*—Paul E. Shapiro
*Attorney, Agent, or Firm*—Townsend and Townsend

[57] ABSTRACT

A game table for combination use in a booth as a video game and for service of food or drink and the like. The game includes a frame above which a table top is pivotally mounted for movement between open and closed positions. A video monitor and components of the game control circuit are mounted within the frame for ready access when the table top is open. Control panels which carry manually-operated control elements are hingeably mounted on opposite sides of the frame to permit the panels to be opened for servicing. The table top includes a transparent panel which, when the top is closed, overlies the monitor and the control panels so that individuals seated at the booth can manipulate the control elements and at the same time view the controls as well as the monitor. A coin box projects from the frame above the plane of the table for convenient access.

8 Claims, 4 Drawing Figures

GAME TABLE FOR BOOTH INSTALLATION

BACKGROUND OF THE INVENTION

This invention relates in general to amusement games, particularly electronic video games for use in establishments serving food and drink.

Video games of the foregoing type have been incorporated into tables or stands for use in food and drink establishments such as restaurants and bars. In certain prior game tables, controls for the games have been mounted below the level of the table top for use by an individual when seated at the table.

Prior video games of the type described for use with tables or stands have not been completely satisfactory in use and operation. In many cases the location of the controls has made it inconvenient for individuals to play the game, especially where the table top obscures viewing of the controls. In other designs the coin box is in a relatively inconvenient position both for access by the players as well as for servicing. Prior designs have also not been suitable for use in booth-type installations, such as table booths where it is desireable to have a completely flat table top for service of food. In addition prior designs have not provided for convenient access to the video monitor and game control components and circuitry for servicing.

OBJECTS AND SUMMARY OF THE INVENTION

It is a general object of the invention to provide a new and improved game table for combination use as a video game and a food and drink service table.

Another object is to provide a game table of the type described for use in a booth-type installation which facilitates access to below-the-table game controls while the players are seated at the table.

Another object is to provide a game table of the type described in which the table top is substantially flat for service of food and drink while at the same time players seated at the table can readily view a video monitor and control elements which are mounted below the level of the table.

Another object is to provide a game table of the type described which facilitates convenient access to the video monitor and control elements and circuitry for maintenance and servicing.

The invention in summary comprises a game table having a frame adapted for installation in a booth. The frame supports a video monitor positioned for viewing from over the table. The frame carries game control means including control panels having below-the-table control elements which are operated by individuals seated at the table. The panels are hinged on the frame for pivoting to an open position for servicing. A table top is hinged on a side of the frame for movement to an open position to permit access to the video monitor and control means for purposes of servicing. The table top includes a transparent panel which overlies both the video monitor and the control panels when the top is closed. A coin box projects from an end of the frame above the level of the table.

The foregoing and additional objects and features of the invention will appear from the following description in which the several embodiments have been set forth in detail in conjunction with the accompanying drawings.

DESCRIPTION OF THE PREFERRED EMBODIMENTS

Figure 1:
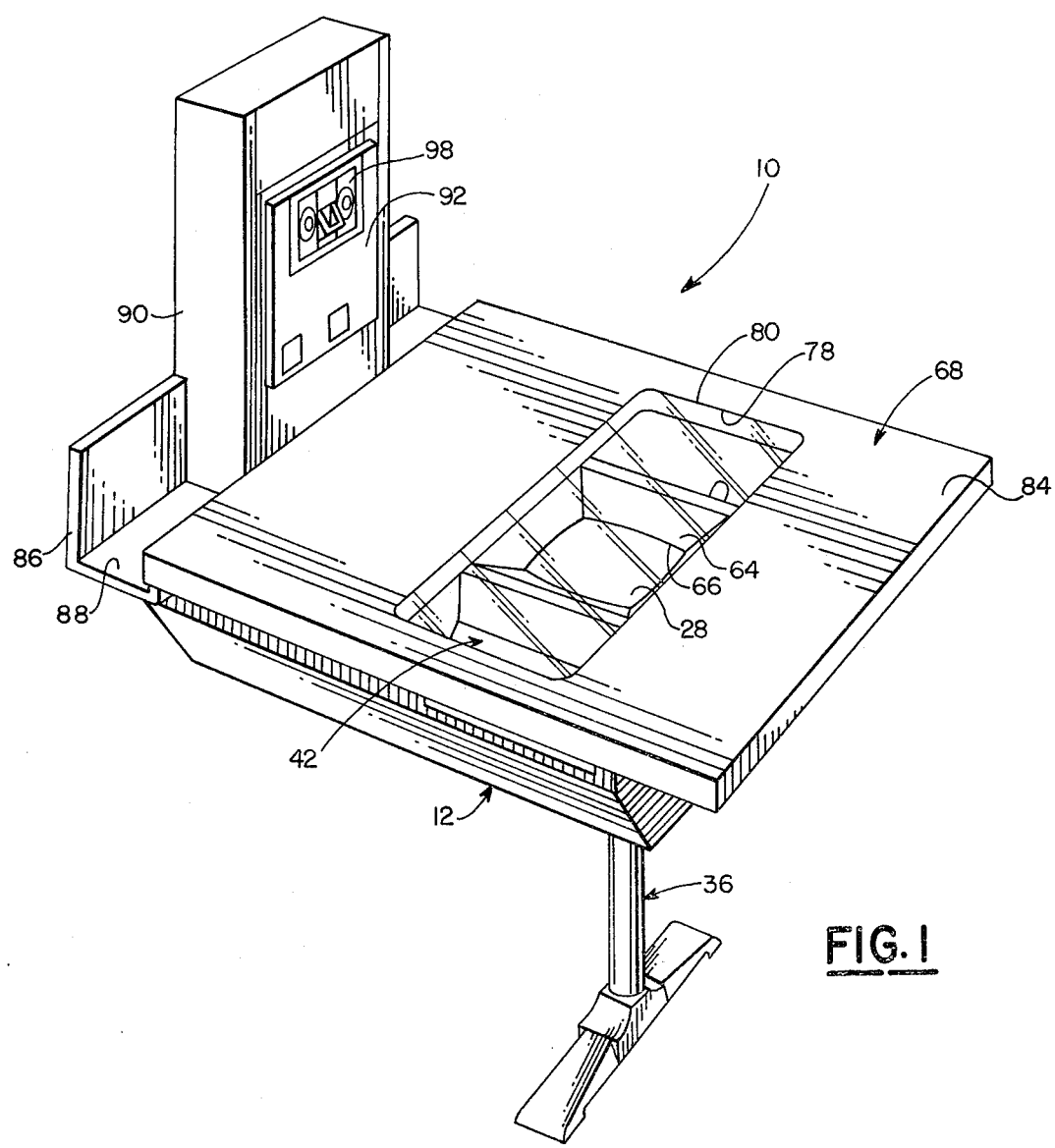
FIG. 1 is a perspective view of a game table incorporating the invention.

In the drawings a game table incorporating one preferred embodiment of the invention is illustrated generally at 10. The table 10 includes a generally box-shaped frame 12 comprising a bottom wall 14 above which are mounted three longitudinally spaced bulkheads 16, 18 and 20. A pair of spaced-apart U-shaped walls 22, 24 are mounted between front bulkhead 16 and center bulkhead 18 to define a generally square-shaped, upwardly open enclosure in which a video monitor 26 is mounted with its screen 28 facing upwardly. A pair of longitudinally extending, spaced-apart walls 30, 32 are fitted between the center bulkhead and rear bulkhead to define a well for mounting an electronics enclosure 34 containing components of the game control circuitry. The frame 12 is supported for installation between seats of a booth by means of a pedestal 36 having a base 38 which mounts on a floor and carries a column 40 fastened to bottom wall 14.

Figure 4:
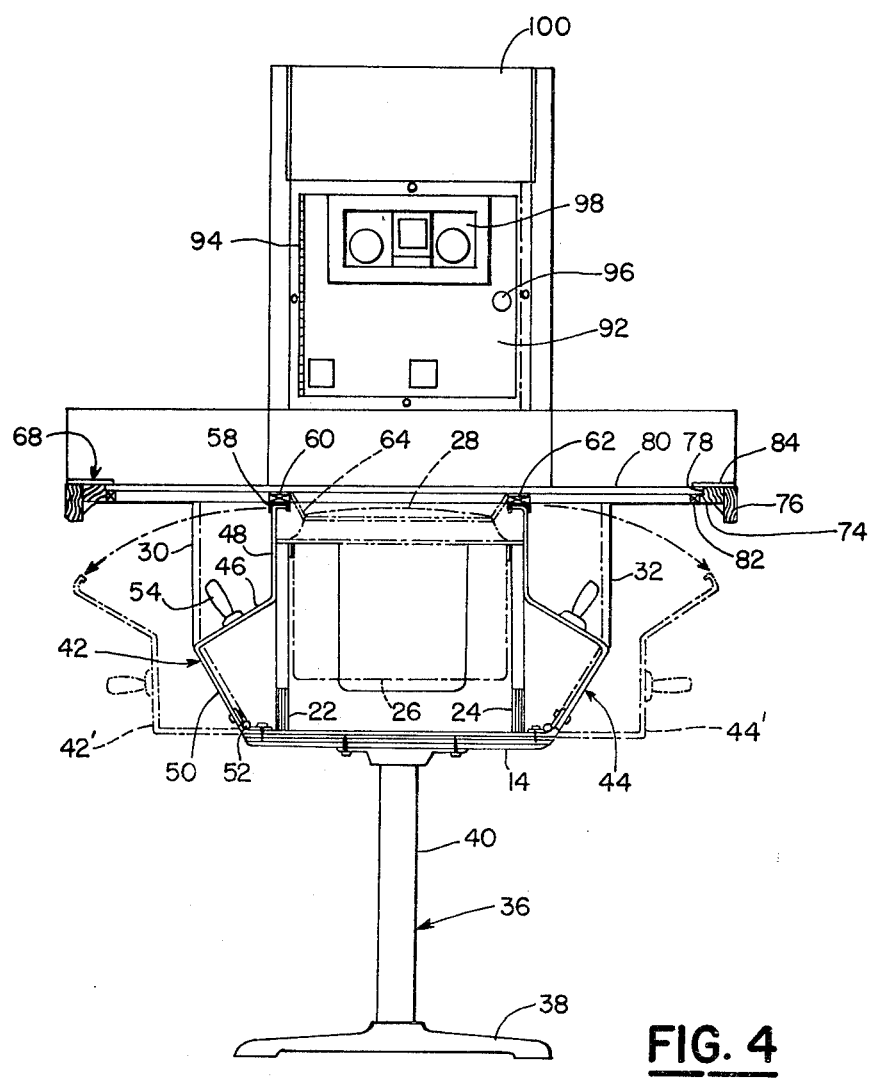
FIG. 4 is a cross sectional view taken along the line 4—4 of FIG. 3.

A pair of control panels 42, 44 are provided at opposite sides of the frame and extend between the front and center bulkheads. Each control panel can be of sheet metal construction and is shaped with a downwardly inclined center panel 46, an upwardly extending top panel 48 and a lower panel 50 which extends at right angles with the center panel. Each control panel is mounted on the frame for pivotal movement about a horizontal axis between a closed position and an open position shown in phantom at 42' and 44' in FIG. 4. The pivotal mounting is provided by a suitable hinge such as the illustrated piano hinge 52 fastened between the edge of frame bottom wall 14 and the lower margin of the lower panel. The center panel of each control panel carries control elements of the game control circuit such as the illustrated manually-operated joystick 54 and the game start button 56. An elongate U-shaped channel 58 is mounted along the inwardly turned edge of the upper panel of each control panel.

The control panels are latched in the closed positions by means of suitable cleats 60, 62 which are carried between the upper margins of the front and center bulkheads. The cleats releasably latch with channels 58 of the control panels. A dish-shaped cardboard mask 64 having a central opening 66 commensurate in size and shape with the screen 28 of the video monitor is mounted above the cleats.

Figure 2:
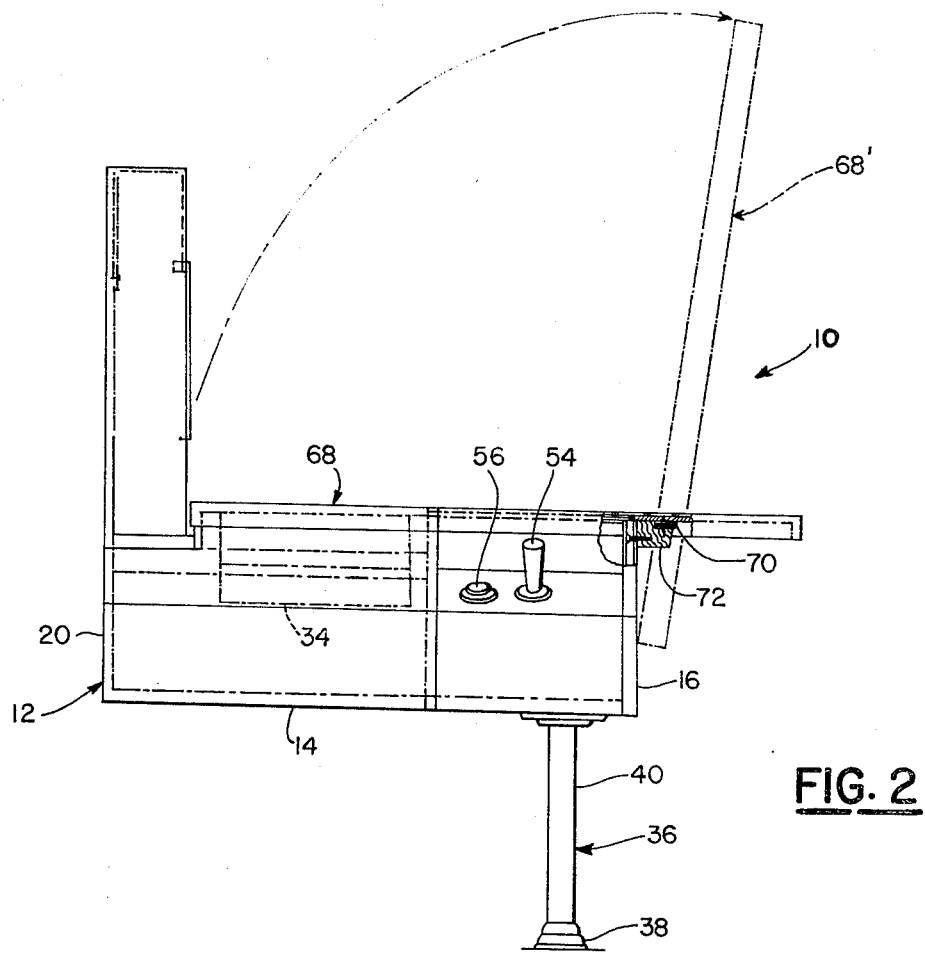
FIG. 2 is a side elevational view, partially broken away, of the table in FIG. 1.
Figure 3:
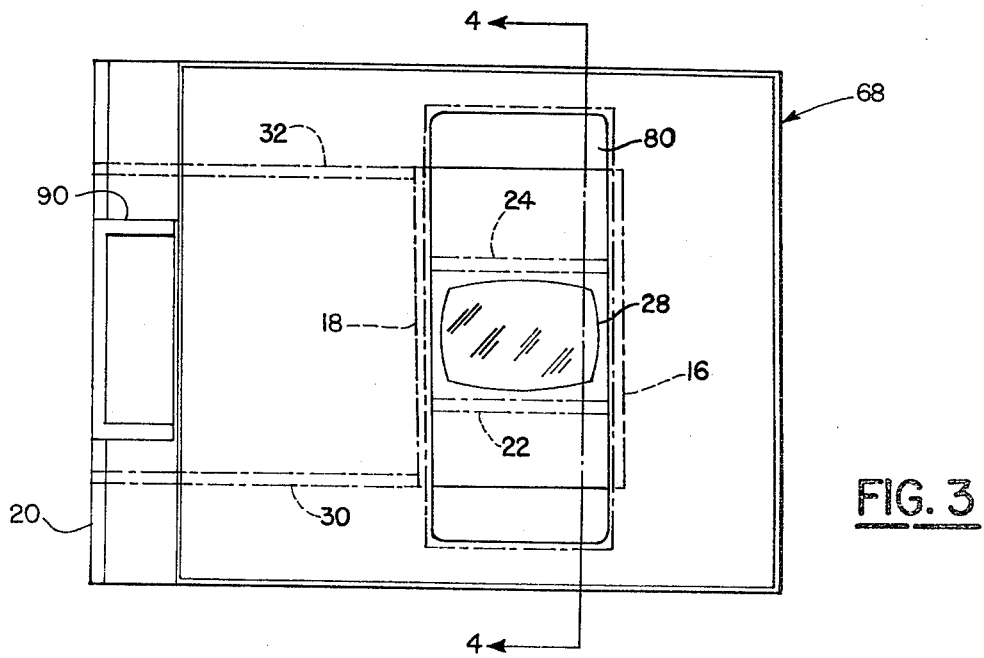
FIG. 3 is a top plan view of the game table.

A rectangular table top 68 is mounted above frame 12 for pivotal movement between a horizontal, closed position and an upwardly extending, open position shown in phantom at 68' in FIG. 2. The table top is pivotally mounted by means of a suitable hinge 70 connected at one side beneath the table top and at the other side along a hinge block 72 which in turn is fastened to the upper margin of front bulkhead 16.

Table top 68 includes a frame 74 of suitable material such as wood about which a perimeter molding 76 is mounted. A rectangular opening 78 is formed in the frame at a position extending over the area of the monitor and control panels when the table top is closed. A transparent panel 80 formed of a strong, rigid material such as tempered glass is mounted within the opening by suitable retainer strips 82. A thin laminate 84 comprised of a suitable hard, durable material is mounted over the table frame, and the laminate is formed with an opening of a size somewhat smaller than the glass panel so that the laminate holds the panel against the retainer strips.

At the rear end of the table a U-shaped splash panel 86 is provided which includes a bottom wall 88 at a level below the surface of the table top. A coin box frame 90 extends from the mid-portion of the splash panel above the level of the table top. A door 92 is pivotally mounted on the frame by a hinge 94 to swing between open and closed positions. A key-operated lock barrel 96 is mounted at the edge of the door for locking the door shut. The door carries a coin box 98 for accepting coins which activate the game control circuit. The upper margin of the coin box frame is formed with a panel 100 for displaying graphics or game instructions and the like.

The use and operation of the invention is as follows. With table top 68 closed its upper surface is flat and unobstructed so that food and drink can be served to individuals seated at the booth. The food and drink can be served and consumed without interference from the below-the-table video monitor and game controls. The coin box 90 is readily accessible for initiating a game. Individuals seated at the table can easily reach under the table top and manipulate the joysticks and control buttons. The display on the screen of the monitor as well as the game controls can be easily observed while the game is being played.

For servicing, the table top is pivoted upwardly to its open position 68 so that ready access is provided to electronics enclosure 34. The control panels 42 and 44 can also be disengaged from the cleats and pivoted downwardly to their open positions. This facilitates access to the control circuitry behind the panels as well as to the video monitor for servicing purposes.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A game table for installation in a booth having seats, the table including the combination of a frame mountable between the seats for supporting a video monitor in a position to be viewed from over the table, game control means carried by the frame for controlling a video display on the monitor, said game control means including at least one manually-operated control element, control panel means mounted on the frame for carrying said control element, a table top mounted over the frame, said table top having a margin which projects over the control panel means, said top including a transparent portion located over the control panel whereby an individual seated at the booth can reach under the table and manipulate the control element with his hands while viewing the monitor and/or the control element through the transparent portion of the table top.

2. A game table as in claim 1 which includes hinge means for mounting the table top for pivotal movement on the frame between open and closed positions, said frame having an open top with the video monitor being accessible for service from the open top when the table top is moved to its open position.

3. A game table as in claim 1 which includes hinge means for mounting the control panel means for pivotal movement on the frame between open and closed positions whereby access for service behind the panel means is provided when the latter is moved to its open position.

4. A game table as in claim 1 in which the table top is planar, and said transparent portion comprises a transparent panel mounted substantially flush with and forming a continuation of the table top whereby the upper surface of the table is unobstructed for serving food or drinks and the like, and the transparent panel extends in vertical register over the video monitor and the control element of the game control means.

5. A game table as in claim 1 in which the game control means includes a coin box means for accepting coins and responding thereto to activate a game, said coin box means being mounted at an end of the frame and projecting above the level of the table top for convenient access by an individual when seated in the booth.

6. A game table as in claim 1 in which the game control means include electrical circuit means having first elements thereof mounted within the frame below the table top and additional elements thereof mounted on the inside of the control panel means, means for mounting the table top for pivotal movement about a horizontal axis to and from the frame whereby with the top moved from the frame the first elements of the circuit means are accessable for servicing, and means for mounting the control panel means for pivotal movement to and from the frame about a horizontal axis whereby with the panel means moved from the frame the additional elements of the circuit means are accessable for servicing.

7. A game table as in claim 6 in which the control panel means comprises a pair of control panels mounted at opposite sides of the frame, each panel carrying at least one control element operable by individuals seated at the booth.

8. A table for combined use for playing a video game and for serving food or drinks and the like at a booth having spaced-apart seats, the table including the combination of an upwardly-open box-like frame, a video monitor carried within the frame, the monitor having a video screen which faces upwardly, a pair of control panels pivotally mounted on the frame and positioned on opposite sides thereof adjacent respective seats, game control means for controlling a video display on the monitor, said game control means including a manually-operated control element mounted on each control panel, said control means further including electrical circuit means having elements mounted within the frame, and a table top mounted on a side of the frame for pivotal movement between open and closed positions respectively away from and toward the frame, said table top including a transparent panel forming a continuation of the upper surface of the top, said transparent panel, when the top is moved to its closed position, being positioned in vertical register over the monitor as well as the control panel whereby individuals seated at opposite sides of the table can use their hands to manipulate the control elements under the table top while at the same time observing the monitor and/or the control elements through the transparent panel.

* * * * *